(12) United States Patent
Sakurai et al.

(10) Patent No.: US 9,861,959 B2
(45) Date of Patent: Jan. 9, 2018

(54) CATALYST COMPOSITION AND EXHAUST GAS PURIFYING METHOD

(71) Applicants: Kenji Sakurai, Gotenba (JP); Shigeki Nakayama, Gotenba (JP); Hiromasa Nishioka, Susono (JP); Hiroyuki Hayashida, Osaka (JP); Yoshikazu Hirose, Osaka (JP)

(72) Inventors: Kenji Sakurai, Gotenba (JP); Shigeki Nakayama, Gotenba (JP); Hiromasa Nishioka, Susono (JP); Hiroyuki Hayashida, Osaka (JP); Yoshikazu Hirose, Osaka (JP)

(73) Assignees: TOYOTA JIDOSHA KABUSHIKI KAISHA, Toyota-shi (JP); DAIICHI KIGENSO KAGAKU KOGYO CO., LTD.A, Suminoe-ku, Osaka (JP)

( * ) Notice: Subject to any disclaimer, the term of this patent is extended or adjusted under 35 U.S.C. 154(b) by 0 days.

(21) Appl. No.: 14/783,326

(22) PCT Filed: Apr. 7, 2014

(86) PCT No.: PCT/IB2014/000491
§ 371 (c)(1),
(2) Date: Oct. 8, 2015

(87) PCT Pub. No.: WO2014/167398
PCT Pub. Date: Oct. 16, 2014

(65) Prior Publication Data
US 2016/0121300 A1   May 5, 2016

(30) Foreign Application Priority Data
Apr. 9, 2013 (JP) .................................. 2013-081023

(51) Int. Cl.
| | | |
|---|---|---|
| *B01J 23/10* | (2006.01) | |
| *B01J 37/02* | (2006.01) | |
| *B01J 37/03* | (2006.01) | |
| *B01J 23/63* | (2006.01) | |
| *B01J 35/04* | (2006.01) | |
| *B01D 53/94* | (2006.01) | |
| *B01J 23/34* | (2006.01) | |

(52) U.S. Cl.
CPC .............. *B01J 23/10* (2013.01); *B01D 53/94* (2013.01); *B01D 53/944* (2013.01); *B01D 53/9477* (2013.01); *B01J 23/34* (2013.01); *B01J 23/63* (2013.01); *B01J 35/04* (2013.01); *B01J 37/0248* (2013.01); *B01J 37/031* (2013.01); *B01D 2255/2042* (2013.01); *B01D 2255/2045* (2013.01); *B01D 2255/2061* (2013.01); *B01D 2255/2063* (2013.01); *B01D 2255/2066* (2013.01); *B01D 2255/2068* (2013.01); *B01D 2255/20715* (2013.01); *B01D 2255/407* (2013.01); *B01D 2258/012* (2013.01); *B01J 2523/00* (2013.01)

(58) Field of Classification Search
CPC ........ B01J 23/10; B01J 23/34; B01J 37/0248; B01J 23/63; B01J 35/04; B01J 37/031; B01J 2523/00; B01J 2523/3756; B01D 53/9477; B01D 53/94; B01D 53/944; B01D 2255/2045; B01D 2255/2063; B01D 2255/2066; B01D 2255/2068; B01D 2255/20715; B01D 2255/407; B01D 2255/2042; B01D 2255/2061
See application file for complete search history.

(56) References Cited

U.S. PATENT DOCUMENTS

| | | | |
|---|---|---|---|
| 2005/0163691 A1* | 7/2005 | Kelkar | B01D 53/8628 423/239.1 |
| 2006/0245985 A1 | 11/2006 | Harada et al. | |
| 2009/0246109 A1* | 10/2009 | Southward | B01D 53/9409 423/239.1 |
| 2009/0280979 A1 | 11/2009 | Hori et al. | |
| 2009/0324468 A1* | 12/2009 | Golden | B01D 53/945 423/210 |
| 2010/0004122 A1* | 1/2010 | Hori | F01N 3/2828 502/303 |
| 2012/0131911 A1 | 5/2012 | Nakagawa et al. | |
| 2013/0115144 A1* | 5/2013 | Golden | C01G 25/00 422/170 |

FOREIGN PATENT DOCUMENTS

| | | |
|---|---|---|
| CN | 101484232 A | 7/2009 |
| CN | 102247826 A | 11/2011 |
| EP | 1967263 A1 | 9/2008 |
| EP | 2036603 A1 | 3/2009 |
| EP | 2055365 A1 | 5/2009 |
| JP | 110-286462 A | 10/1998 |
| JP | 2006-326573 A | 12/2006 |
| JP | 2008-012410 A | 1/2008 |
| JP | 2008-221204 A | 9/2008 |
| JP | 2010-196552 A | 9/2010 |
| JP | 2012-518531 A | 8/2012 |
| JP | 2013-059759 A | 4/2013 |
| JP | 2014-124631 A | 7/2014 |
| WO | 2010/104658 A2 | 9/2010 |
| WO | 2012/029051 A1 | 3/2012 |
| WO | 2014/102586 A1 | 7/2014 |

* cited by examiner

*Primary Examiner* — Anthony J Zimmer
(74) *Attorney, Agent, or Firm* — Andrews Kurth Kenyon LLP

(57) ABSTRACT

An exhaust gas purifying catalyst of the present invention includes: a first metal oxide selected from the group of praseodymium oxide, terbium oxide, and a combination thereof; a second metal oxide that is neodymium oxide; a third metal oxide that is zirconia or a combination of zirconia and ceria; and a fourth metal oxide selected from the group of lanthanum oxide, yttrium oxide, barium oxide, calcium oxide, strontium oxide, silicon oxide and a combination thereof.

15 Claims, 2 Drawing Sheets

F I G . 1

CATALYST COMPOSITION AND EXHAUST GAS PURIFYING METHOD

CROSS-REFERENCE TO RELATED APPLICATIONS

This is a national phase application based on the PCT International Patent Application No. PCT/IB2014/000491 filed Apr. 7, 2014, claiming priority to Japanese Patent Application No. 2013-081023 filed Apr. 9, 2013, the entire contents of both of which are incorporated herein by reference.

BACKGROUND OF THE INVENTION

1. Field of the Invention

The present invention relates to a catalyst composition and an exhaust gas purifying method. In particular, the present invention relates to an exhaust gas purifying catalyst and an exhaust gas purifying method for purifying an exhaust gas from an internal combustion engine of an automobile and the like.

2. Description of Related Art

Nitrogen oxides (NOx), carbon monoxide (CO), hydrocarbons (HC) and so on are contained in the exhaust gas from an internal combustion engine such as an automobile engine. Accordingly, generally, after being purified with an exhaust gas purifying catalyst that oxidizes CO and HC and reduces NOx, the exhaust gas is discharged into air.

Further, the exhaust gas that is discharged from the internal combustion engine contains, in addition to the nitrogen oxides and other above-mentioned substances, particulate materials referred to as particulate matter (PM) or particulate. In recent years, the restriction on the PM has become more severe than ever, and accordingly, it is demanded to efficiently remove the PM together with the nitrogen oxides and other substances.

For removing the PM, a method in which the PM is collected on a filter such as a diesel particulate filter, and the collected PM is removed by oxidation by intermittently raising a temperature of the filter.

However, a high temperature is necessary to remove the PM collected on the filter by oxidation, and this may cause degradation of the fuel consumption. Further, in the PM removal that depends on the filter, pressure loss due to the filter may also cause degradation of the fuel consumption.

For such a problem, a method is proposed in which by use of a catalyst having strong oxidizing power, the oxidation removal of PMs is promoted.

Regarding this, Japanese Patent Application Publication No. 2010-196552 (JP 2010-196552 A) proposes a method in which in exhaust gas purification for an internal combustion engine that performs a theoretical air-fuel ratio (stoichiometric) operation, a material having ceria ($Ce_2O_3$) or praseodymium oxide ($Pr_2O_3$) as a main component and a material having neodymium oxide ($Nd_2O_3$) as a main component are used and, as required, an air-fuel ratio of the exhaust gas is slightly and continuously fluctuated around the theoretical air-fuel ratio (14.5), more specifically, for example, the air-fuel ratio is continuously fluctuated in the range of 14.0 to 15.0, thus, ceria or praseodymium oxide is oxidized and reduced and active oxygen is generated thereby, and the PMs in the exhaust gas are removed by oxidation with the active oxygen.

The present invention provides an exhaust gas purifying catalyst and an exhaust gas purifying method for removing the PMs by oxidation.

JP 2010-196552 A proposes a method for removing the PMs by oxidation in an internal combustion engine that performs a theoretical air-fuel ratio (stoichiometric) operation. However, according to the method, since purification of the exhaust gas from an internal combustion engine that performs the theoretical air-fuel ratio (stoichiometric) operation is supposed, there was a room for improvement in the fuel consumption.

SUMMARY OF THE INVENTION

On the other hand, an exhaust gas purifying catalyst of the present invention is used for oxidation removal of the PMs contained in an exhaust gas from a lean-burn engine such as a lean-burn gasoline engine or a diesel engine, which are considered preferable from the viewpoint of the fuel consumption.

The present inventors fortunately found that a combination of praseodymium oxide and neodymium oxide can preferably be used for oxidation removal of the PMs in an exhaust gas from a lean-burn engine.

A catalyst composition of an embodiment of the present invention includes: a first metal oxide selected from the group of praseodymium oxide, terbium oxide, and a combination thereof; a second metal oxide that is neodymium oxide; a third metal oxide that is zirconia or a combination of zirconia and ceria; and a fourth metal oxide selected from the group of lanthanum oxide, yttrium oxide, barium oxide, calcium oxide, strontium oxide, silicon oxide, and a combination thereof.

The catalyst composition of the embodiment may include the fourth metal oxide that is a combination of lanthanum oxide and yttrium oxide, or a combination of lanthanum oxide and silicon oxide.

The catalyst composition of the embodiment may include the first to fourth metal oxides, in each of which a composite oxide containing these oxides is formed.

The catalyst composition of the embodiment may include the first metal oxide and the second metal oxide at a weight ratio in the range of 1:9 to 9:1 when converted in terms of trivalent oxide.

The catalyst composition of the embodiment may be such that a weight ratio of a sum total of the first and second metal oxides and the third metal oxide is 1:9 to 9:1 when the first and second metal oxides are converted in terms of trivalent oxide.

The catalyst composition of the embodiment may be such that a weight ratio of a sum total of the first and second metal oxides and the fourth metal oxide is 10:0.1 to 10:5 when the first and second metal oxides are converted in terms of trivalent oxide.

The catalyst composition of the embodiment may further include a noble metal carried on the first and second metal oxides.

The catalyst composition of the embodiment may be exhaust gas purifying catalyst.

The catalyst composition of the embodiment may be exhaust gas purifying catalyst for use in a lean-burn engine.

A catalyst device of the embodiment of the present invention may include a base material and the catalyst composition of the embodiment carried on the base material.

The catalyst device of the embodiment may further include ceria particles carried on the base material.

The catalyst device of the embodiment may include the base material that is a straight flow honey comb base material.

A method of purifying an exhaust gas of the embodiment may include bringing an exhaust gas from a lean-burn engine into contact with the catalyst composition of the embodiment or introducing an exhaust gas from a lean-burn engine to the catalyst device of the embodiment.

The method of purifying an exhaust gas of the embodiment may be such that the lean-burn engine is a lean-burn gasoline engine or diesel engine as the lean-burn engine.

The method of purifying an exhaust gas of the embodiment may include further bringing the exhaust gas brought into contact with the exhaust gas purifying catalyst or the exhaust gas flowed to the catalyst device into contact with a NOx storage and reduction catalyst.

The method of purifying an exhaust gas of the embodiment may make the exhaust gas from the lean-burn engine intermittently a stoichiometric or a fuel-rich atmosphere.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
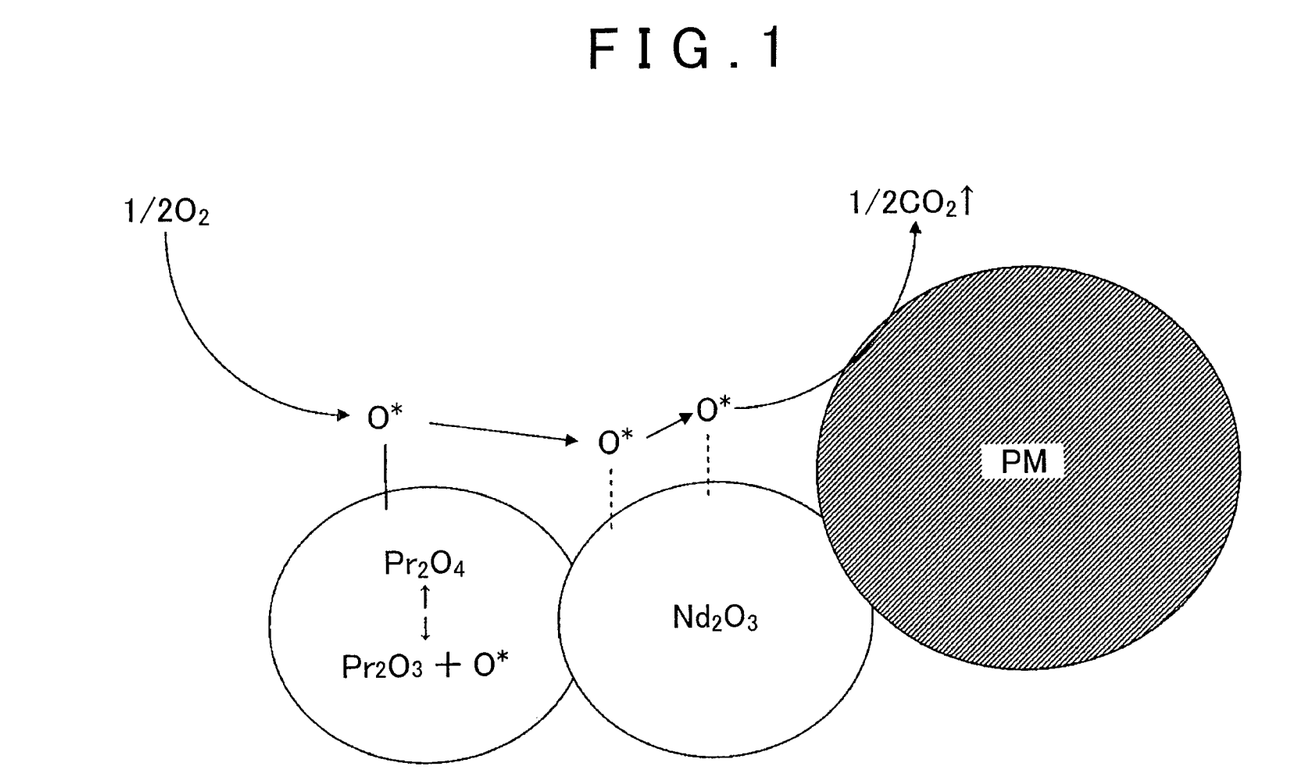
FIG. 1 is a conceptual diagram of a catalyst mechanism of an exhaust gas purifying catalyst of the present invention.

The present invention will be described with reference to FIG. 1. FIG. 1 is a conceptual diagram that shows a catalytic mechanism of an exhaust gas purifying catalyst of the present invention.

As shown in FIG. 1, it is considered that an exhaust gas purifying catalyst of the present invention, in particular, exhaust gas purifying catalyst particles repetitively oxidize and reduce a first metal oxide such as praseodymium oxide in an exhaust gas, in particular, in an exhaust gas from a lean-burn engine between tetravalent oxide ($Pr_2O_4$) and trivalent oxide ($Pr_2O_3$), at this time, an active oxygen ($O^*$) such as a superoxide anion radical ($O_2^-$) or singlet oxygen ($^1O_2$) is released, and the active oxygen removes the PMs by oxidation through a second metal oxide that is neodymium oxide ($Nd_2O_3$). Here, it is considered that the second metal oxide that is neodymium oxide is stable in the oxidation number and tends to attract the active oxygen because it is an electron releasing (basic) oxide, and the second metal oxide thus contributes to temporally store the active oxygen.

In the case where for exhaust gas from the lean-burn engine, ceria is used in place of the first metal oxide such as praseodymium oxide, sufficient removal of the PM by oxidation cannot be achieved. On the contrary, for the stoichiometric exhaust gas, when ceria is used in place of the first metal oxide such as praseodymium oxide, more excellent oxidation removal of the PMs may be achieved.

Although not limited to theory, such difference between the first metal oxide such as praseodymium oxide and ceria is considered due to that the first metal oxide such as praseodymium oxide has a standard potential when reduced from tetravalent to trivalent larger than that of ceria, in other words, the first metal oxide such as praseodymium oxide tends to be reduced from tetravalent to trivalent, accordingly, also in a relatively acidic atmosphere, the first metal oxide is reduced from tetravalent to trivalent, and at this time, the active oxygen can be released.

For reference, standard reduction potentials for ceria, praseodymium oxide, and terbium oxide by Latimer formula will be shown below.

[Chemical Formula 1]

In other words, such a difference between the first metal oxide such as praseodymium oxide and ceria is considered due to the following reasons of (1) to (4).

(1) In a ceria stoichiometric exhaust gas in a stoichiometric exhaust gas, that is, in an exhaust gas in which an oxygen concentration is low and an oxidizing property is small thereby, ceria is readily reduced from tetravalent ($Ce_2O_4$) to trivalent ($Ce_2O_3$) and readily oxidized from trivalent to tetravalent due to change in the air-fuel ratio, and ceria thus tends to be repetitively oxidized and reduced.

(2) In a praseodymium oxide stoichiometric exhaust gas in a stoichiometric exhaust gas, that is, in an exhaust gas in which an oxygen concentration is small and an oxidizing property is small thereby, the first metal oxide such as praseodymium oxide is, while being readily reduced from tetravalent ($Pr_2O_4$) to trivalent ($Pr_2O_3$), difficult to be oxidized from trivalent to tetravalent, that is, it is difficult to be repetitively oxidized and reduced.

(3) In an exhaust gas from a ceria lean-burn engine in an exhaust gas from a lean-burn engine, that is, in an exhaust gas in which an oxygen concentration is large and an oxidizing property is large, since ceria is readily oxidized from trivalent ($Ce_2O_3$) to tetravalent ($Ce_2O_4$) but is difficult to reduce from tetravalent to trivalent, it is difficult to repetitively oxidize and reduce ceria.

(4) In an exhaust gas from a praseodymium oxide lean-burn engine in an exhaust gas from a lean-burn engine, that is, in an exhaust gas in which an oxygen concentration is large and an oxidizing property is large, the first metal oxide such as praseodymium oxide is readily reduced from tetravalent ($Pr_2O_4$) to trivalent ($Pr_2O_3$) and readily oxidized from trivalent to tetravalent due to a change in the air-fuel ratio, therefore the first metal oxide tends to be repetitively oxidized and reduced. Both of praseodymium oxide and terbium oxide that are the first metal oxide can exist as a composite oxide of trivalent oxide and tetravalent oxide ($Pr_6O_{11}$, $Tb_4O_7$), this also is considered to promote a repetitive oxidation/reduction reaction between the trivalent oxide and the tetravalent oxide.

Figure 2A:
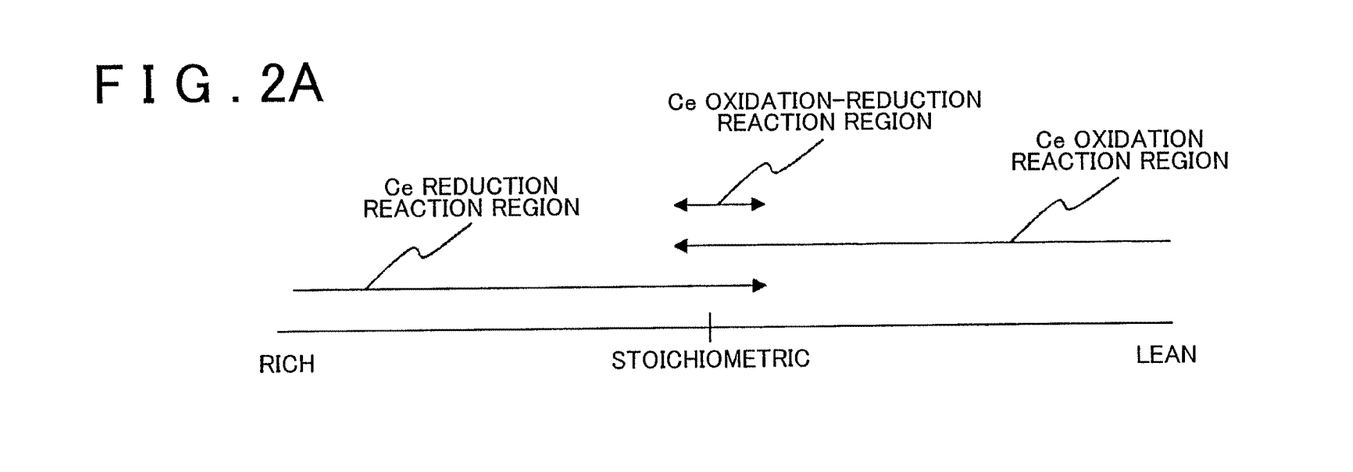
FIG. 2A is a diagram that shows an oxidation-reduction reaction region of ceria.
Figure 2B:
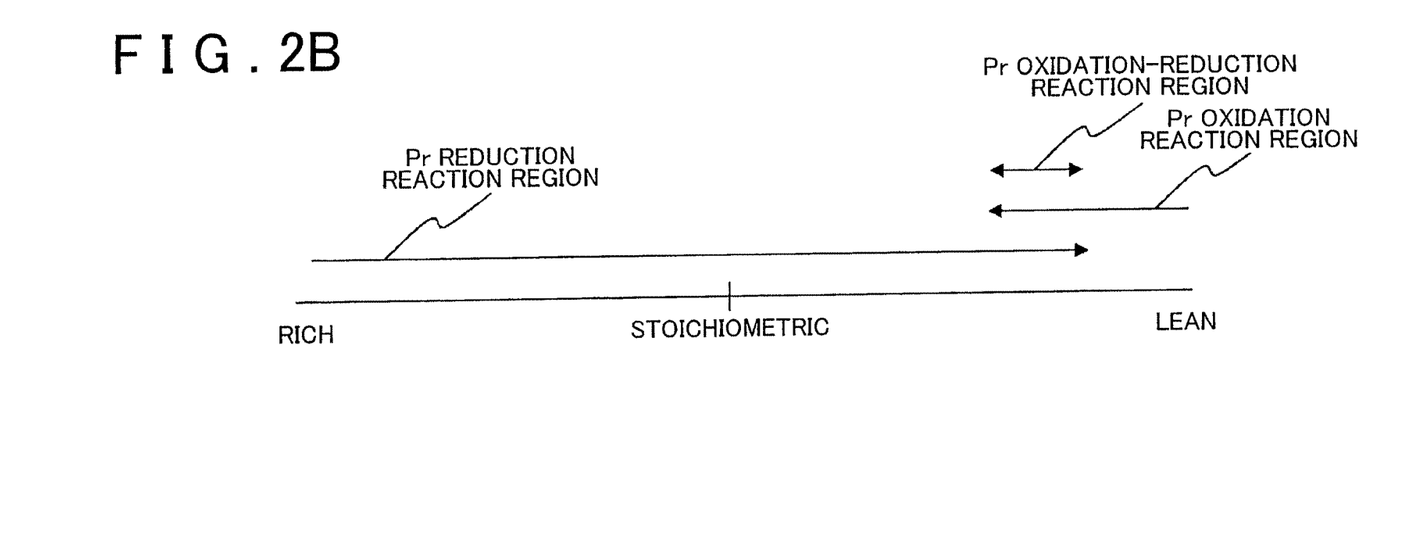
FIG. 2B is a diagram that shows an oxidation-reduction reaction region of a first metal oxide such as praseodymium oxide.

The differences shown in the (1) to (4) between the first metal oxide such as praseodymium oxide and ceria are summarized in the following Table 1 and FIG. 2. FIG. 2A and FIG. 2B show the difference between the first metal oxide such as praseodymium oxide and ceria in the oxidation/reduction reaction.

TABLE 1

| | Stoichiometric atmosphere | | | Lean atmosphere | | |
|---|---|---|---|---|---|---|
| Element | Reduction | Oxidation | Repetitive oxidation-reduction | Reduction | Oxidation | Repetitive oxidation-reduction |
| Ce | Easy | Easy | Easy | Not easy | Easy | Not easy |
| Pr | Easy | Not easy | Not easy | Easy | Easy | Easy |
| Tb | Easy | Not easy | Not easy | Easy | Easy | Easy |

In Table 1 and FIG. 2, "oxidation" denotes oxidation from trivalent to tetravalent, and "reduction" denotes reduction from tetravalent to trivalent.

In the exhaust gas purifying catalyst of the present invention, an effect of oxidation removal of the PMs due to such first metal oxide and second metal oxide can be promoted by zirconia or a combination of zirconia ($Zr_2O_2$) and ceria ($Ce_2O_3$), which is the third metal oxide that gives the heat resistance to the exhaust gas purifying catalyst, and barium oxide that is the fourth metal oxide for controlling the acidity or basicity of the exhaust gas purifying catalyst.

The exhaust gas purifying catalyst of the present invention includes: the first metal oxide selected from the group of praseodymium oxide ($Pr_6O_{11}$), terbium oxide ($Tb_4O_7$) and a combination thereof; a second metal oxide that is neodymium oxide ($Nd_2O_3$); the third metal oxide that is zirconia ($ZrO_2$), or a combination of zirconia ($ZrO_2$) and ceria ($Ce_2O_3$); and a fourth metal oxide selected from the group of lanthanum oxide ($La_2O_3$), yttrium oxide ($Y_2O_3$), barium oxide (BaO), calcium oxide (CaO), strontium oxide (SrO), silicon oxide ($SiO_2$) and a combination thereof. In the exhaust gas purifying catalyst of the present invention, in particular, as the fourth metal oxide, a combination of lanthanum oxide and yttrium oxide, or a combination of lanthanum oxide and silicon oxide can be used.

According to the exhaust gas purifying catalyst of the present invention, hydrocarbons and PM contained in an exhaust gas, in particular the PMs contained in an exhaust gas from a lean-burn engine can efficiently be removed by oxidation.

In the exhaust gas purifying catalyst of the present invention, the first to fourth metal oxides may form a composite oxide containing these metal oxides. When the exhaust gas purifying catalyst has a form of a composite oxide like this, it is considered that generation of active oxygen by the first metal oxide such as praseodymium oxide and reception of the active oxygen by the second metal oxide that is neodymium oxide can smoothly be performed.

Here, a "composite oxide particle" of the present invention means a particle of a material in which at least two kinds of metal oxides are at least partially dissolved. Accordingly, for example, a particle of a composite oxide of praseodymium and neodymium means a particle in which praseodymium oxide and neodymium oxide are at least partially dissolved, in particular, both of praseodymium and neodymium at least partially form an oxide having a single crystal structure. Alternatively, for example, a "composite oxide particle" of praseodymium and neodymium may be a particle that contains not only a portion where praseodymium oxide and neodymium oxide are dissolved but also a portion where each of praseodymium oxide and neodymium oxide exists singularly.

In the exhaust gas purifying catalyst of the present invention, the first to fourth metal oxides can be used at an optional ratio therebetween. For example, the weight ratio of the first metal oxide and the second metal oxide may be in the range of 1:9 to 9:1, 2:8 to 8:2, or 3:7 to 7:3 when converted in terms of trivalent oxide. Further, for example, the weight ratio of a sum total of the first and second metal oxides and a third metal oxide may be in the range of 1:9 to 9:1, 2:8 to 8:2, or 3:7 to 7:3 when the first and second metal oxides are converted in terms of trivalent oxide. Still further, for example, the weight ratio of a sum total of the first and second metal oxides and a fourth metal oxide may be in the range of 10:0.1 to 10:5, 10:0.1 to 10:3, or 10:0.5 to 10:2 when the first and second metal oxides are converted in terms of trivalent oxide.

In the exhaust gas purifying catalyst of the present invention, a noble metal may be carried on the first and second metal oxides. As such noble metal, a noble metal selected from the group of ruthenium (Ru), rhodium (Rh), palladium (Pd), osmium (Os), iridium (Ir), platinum (Pt), and silver (Ag), as well as a combination thereof, in particular, platinum and/or palladium can be used.

Further, a total carried amount of the noble metal can be set to, for example, 0.1 g/base material-L or more, 0.3 g/base material-L or more, 0.5 g/base material-L or more and 4.0 g/base material-L or less, 3.0 g/base material-L or less, or 2.0 g/base material-L or less.

For example, the exhaust gas purifying catalyst of the present invention can be manufactured by an optional method, for example, a method such as an impregnating method, a coprecipitation method, or a sol-gel method.

For example, when the exhaust gas purifying catalyst of the present invention is manufactured according to a coprecipitation method, the method can include the following steps: a step of supplying a raw material solution containing salts of metals forming the first to fourth oxides; a step of adding a neutralizing agent to the raw material solution to precipitate a precursor of a composite oxide and preparing a catalyst precursor slurry thereby; a step of impregnating the metal oxide supporting particles with the catalyst precursor slurry; and the metal oxide supporting particles impregnated with the catalyst precursor slurry are dried and sintered.

When the exhaust gas purifying catalyst of the present invention is manufactured by a coprecipitation method, a uniform composite oxide of the first to fourth metal oxides can be advanced.

As salts of the first to fourth metal oxides, a nitrate, a sulfate, and an acetate can be used.

As the neutralizing agent, for example, inorganic basic compounds such as ammonia ($NH_3$), sodium carbonate ($Na_2CO_3$), sodium hydroxide (NaOH), potassium hydroxide (KOH) can be used. Further, as the neutralizing agent, for example, organic basic compounds such as pyridine or (poly)ethylenediamine compound can be used.

As a solvent of the raw material solution, alcohols such as methanol, ethanol, and isopropanol, or water, and preferably water can be used.

Drying and sintering can be performed under an optional condition that can obtain the exhaust gas purifying catalyst. For example, the drying can be performed in air at a temperature of 50 or more and 200° C. or less, and, the sintering can be performed at a temperature of 300° C. or more, 600° C. or more and less than 800° C., 700° C. or less, for 1 to 10 hours, or 2 to 8 hours.

A reactor for carrying out the method is not particularly limited, that is, a batch reactor or a continuous reactor can be used.

When the exhaust gas purifying catalyst of the present invention is manufactured, the precursors of the first to fourth metal oxides are not precipitated at one time but may be formed in such a manner that, for example, a precursor of a part of the metal oxides is precipitated in advance, a raw material solution of the other metal oxide is added thereto, and a precursor of the other metal oxide can be precipitated.

A noble metal can be carried on the first to fourth metal oxides according to an optional method. For example, when platinum is carried, a catalyst carrier is impregnated with an aqueous solution of dinitrodiammine platinum nitrate and dried and sintered, and platinum can be carried on the first and second metal oxides thereby.

A catalyst device of the present invention includes a base material and an exhaust gas purifying catalyst of the present invention that is carried on the base material. As such base material, a honeycomb base material, specifically, a straight flow honeycomb base material, or a wall flow honeycomb base material, particularly, the straight flow honeycomb base material can be used.

According to the catalyst device of the present invention, the PMs contained in the exhaust gas from a lean-burn engine can efficiently be removed by oxidation. In addition, when the straight flow honeycomb base material is used as the base material in the catalyst device of the present invention, while efficiently removing the PMs by oxidation, the exhaust gas purifying catalyst of the present invention can achieve small pressure loss of the straight flow honeycomb base material.

A honeycomb that can be used as the base material can be formed with a ceramic material such as codierite or a metal material such as stainless steel.

The catalyst device of the present invention can be manufactured according to an optional method. For example, the catalyst device can be manufactured in such a manner that a slurry that contains the exhaust gas purifying catalyst of the present invention and a metal oxide sol as a binder is coated on the base material and the base material that is coated with the slurry is dried and sintered.

A method of purifying the exhaust gas of the present invention includes bringing the exhaust gas into contact with the exhaust gas purifying catalyst of the present invention, or flowing the exhaust gas to the exhaust gas purifying device of the present invention.

According to the exhaust gas purifying method of the present invention, the PM contained in the exhaust gas, in particular, the exhaust gas from the lean-burn engine can efficiently be removed by oxidation.

The lean-burn engine in which the exhaust gas is purified by the exhaust gas purifying method of the present invention may be either a lean-burn gasoline engine or a diesel engine. The "lean-burn engine" of the present invention means an engine of which the air-fuel ratio during normal operation is 16 or more, the air-fuel ratio may be, for example, 16 or more, 18 or more, or 20 or more. Further, the air-fuel ratio may be 100 or less, 80 or less, 60 or less, 40 or less, or 30 or less.

According to the exhaust gas purifying method of the present invention, the exhaust gas that is brought into contact with the exhaust gas purifying catalyst, or the exhaust gas that has been flowed through the catalyst device can further be brought into contact with a NOx storage and reduction catalyst.

Further, in this case, the exhaust gas from the lean-burn engine can intermittently be made into a stoichiometric or fuel-rich atmosphere at an interval of, for example, 10 sec or more, 30 sec or more, or 1 minute or more, and 10 minutes or less, 5 minutes or less, or 3 minutes or less. Here, the stoichiometric or fuel-rich atmosphere means an atmosphere, of which the air-fuel ratio is 16 or more, 15 or more, or 14 or more.

Like this, in the case where the exhaust gas from the lean-burn engine is brought into contact with a NOx storage and reduction catalyst, and is intermittently rendered into a stoichiometric or fuel-rich atmosphere, when NOx in the lean exhaust gas is stored in a NOx storage material of the NOx storage and reduction catalyst, and the exhaust gas is intermittently changed into a stoichiometric or fuel-rich atmosphere, the NOx stored in the NOx storage material can be reduced to nitrogen.

As the NOx storage material that stores NOx in the NOx storage and reduction catalyst, an alkaline earth metal such as barium, an alkali metal such as potassium are known.

Hereinafter, the present invention will be described with reference to examples. However, the present invention is not limited thereto.

Comparative Examples 1 to 3 and Reference Example 1

Comparative Example 1

<Manufacture of Al—Ce—Zr Composite Oxide Powder>

To a zirconium (Zr) oxychloride slurry, a solution of aluminum (Al) nitrate and a solution of cerium (Ce) nitrate were added, and 25% ammonium hydroxide was added, and a mixed hydroxide slurry of aluminum-cerium-zirconium (Al—Ce—Zr) was obtained.

Thereafter, the resulted mixed hydroxide slurry was filtrated and cleansed with water, and a mixed hydroxide of Al—Ce—Zr was obtained.

The resulted mixed hydroxide was calcined at 750° C. for 5 hours to form Al—Ce—Zr composite oxide powder, the composite oxide powder was pulverized to 20 μm or less by an agate mortar, and composite oxide powder of Comparative Example 1 was obtained. Here, the Al—Ce—Zr composite oxide powder of Comparative Example 1 contained alumina (converted in terms of $Al_2O_3$), ceria (converted in terms of $CeO_2$), and zirconia (converted in terms of $ZrO_2$) at a mass ratio of 10:7:3.

<Carrying of Noble Metal on Composite Metal Oxide>

To ion-exchanged water, about 150 g of the composite oxide powder prepared as shown above and 10 g of an aqueous solution of dinitrodiamine platinum nitrate (4.6% by mass of 8P manufactured by Tanaka Kikinzoku Kogyo KK) were added, the mixture was stirred for 1 hour and milled (pulverized) for 4 hours.

Thereafter, the resulted powder was transferred into a crucible and dried at 80° C. for about 1 to 2 hours. The dried powder was raked out of the crucible, after pulverized again, further dried at 250° C. for 2 hours or more.

The additionally dried powder was transferred into a high heat resistance crucible, subjected to drying at 600° C. for 1 hour at the end, and raked out of the crucible, and thus a catalyst powder of Comparative Example 1 was obtained.

<Carrying of Catalyst Powder on Base Material>

Into a container having high cleanness, 150 g of the catalyst powder of Comparative Example 1 obtained as shown above, 30 g of ceria, 15 g of silica sol (SNOWTEX NXS, 14.5% by mass as $SiO_2$, manufactured by Nissan Chemical Industries, LTD.) as a binder, 30 g of zirconia sol (ZIRCONIA HA, neutral pH: 6.31, manufactured by Daiichi Kigenso Kagaku Kogyo Co., Ltd.) as a binder, and 120 g of ion-exchanged water were charged, the mixture was stirred for about 2 hours, and thus a catalyst powder slurry was prepared.

The resulted catalyst powder slurry was coated on a straight flow honeycomb base material for evaluation (diameter 30 mm×length 50 mm, 12/300C-680, manufactured by NGK Industries, Ltd.).

The catalyst powder slurry was coated on a honeycomb base material according to a suction coating method under reduced pressure, in which the honeycomb base material was dipped in a slurry in a sealed vessel, a sealed vessel itself was depressurized by a vacuum pump, and the slurry was suctioned by the honeycomb base material.

Thereafter, preliminarily drying was conducted at 45° C., drying at 250° C. was conducted for about 2 hours, and drying at 600° C. all night and all day was performed, and a catalyst carrying honeycomb base material of Comparative Example 1 was obtained.

A coat amount of the catalyst carrying honeycomb base material of Comparative Example 1 was 150 g of Al—Ce—Zr composite oxide powder and 30 g of ceria powder. An outline of the catalyst of Comparative Example 1 is shown in Table 2.

Comparative Example 2

<Manufacture of Nd—Zr Composite Oxide Powder>

An aqueous solution that contains zirconium oxychloride octahydrate was prepared, to the aqueous solution, 35% hydrochloric acid and ion exchanged water were added such that an acid concentration was 0.67 N and a concentration in terms of zirconia ($ZrO_2$) was 4 w/v %.

To the prepared solution, a solution of 5% sodium sulfate of which pH was adjusted at 12.5 with sodium hydroxide was added, the mixture was heated to 95° C. and kept for 15 minutes, and thus, a basic zirconium sulfate slurry was obtained.

Thereafter, to the basic zirconium slurry, a neodymium nitrate solution was added, then 25% sodium hydroxide was added, and thus, a neodymium-zirconium (Nd—Zr) mixed hydroxide slurry was obtained.

Thereafter, the resulted mixed hydroxide slurry was filtrated and cleansed with water, and Nd—Zr mixed hydroxide was obtained.

The resulted mixed hydroxide was calcined at 750° C. for 5 hours to form a Nd—Zr composite oxide powder, the composite oxide powder was pulverized with an agate mortar to 20 μm or less, and thus, a composite oxide powder of Comparative Example 2 was obtained. Here, an Nd—Zr composite oxide powder of the Comparative Example 2 contained neodymium oxide (in terms of $Nd_2O_3$) and zirconia (in terms of $ZrO_2$) at the weight ratio of 3:2.

<Carrying of Noble Metal on Composite Oxide Powder>

In the same manner as that of Comparative Example 1 except that into ion exchanged water, about 100 g of the composite oxide powder of Comparative Example 2 manufactured as shown above, 50 g of alumina powder, 30 g of ceria powder, and 10 g of an aqueous solution of dinitrodiamine platinum nitrate (4.6% by mass of 8P manufactured by Tanaka Kikinzoku Kogyo KK) were added, the mixture was stirred for 1 hour, and a catalyst powder of Comparative Example 2 was obtained.

<Carrying of Catalyst Powder on Base Material>

Next, 180 g of the catalyst powder of Comparative Example 2, which was obtained as described above, was carried on a straight flow honeycomb base material for evaluation in the same manner as that of Comparative Example 1, and thus, a catalyst carrying honeycomb base material of Comparative Example 2 was obtained.

A coat amount of the catalyst carrying honeycomb base material of Comparative Example 2 was 100 g of the Nd—Zr composite oxide powder and 30 g of ceria powder. An outline of the catalyst of Comparative Example 2 is shown in Table 2.

Comparative Example 3

As Comparative Example 3, only a straight flow honeycomb base material for evaluation on which a catalyst is not carried was used.

Reference Example 1

<Manufacture of Nd—Pr—Zr Composite Oxide Powder>

An aqueous solution containing zirconium oxychloride octahydrate was prepared, and, to the aqueous solution, 35% hydrochloric acid and ion-exchanged water were added such that an acid concentration was 0.67 N and a concentration in terms of zirconia ($ZrO_2$) was 4 w/v %.

To the prepared solution, a 5% sodium sulfate solution of which pH was adjusted to 12.5 with sodium hydroxide was added, the mixture was heated up to 95° C. and kept there for 15 minutes, and thus, a basic zirconium sulfate slurry was obtained.

Thereafter, a neodymium nitrate solution and a praseodymium nitrate solution were added to the basic zirconium slurry, then 25% sodium hydroxide was added therein, and thus, a Nd—Pr—Zr mixed hydroxide slurry was obtained.

Thereafter, the resulted mixed hydroxide slurry was filtrated and cleansed with water, and thus, Nd—Pr—Zr mixed hydroxide was obtained.

The resulted mixed hydroxide was calcined at 750° C. for 5 hours to form Nd—Pr—Zr composite oxide powder, the composite oxide powder was pulverized with an agate mortar to 20 μm or less, thus, a composite oxide powder of Reference Example 1 was obtained. Here, the Nd—Pr—Zr composite oxide powder contained neodymium oxide (in terms of $Nd_2O_3$), praseodymium oxide (in terms of $Pr_2O_3$) and zirconia (in terms of $ZrO_2$) at the weight ratio of 36:20:44.

<Carrying of Noble Metal on Composite Oxide Powder>

In the same manner as that of Comparative Example 1 except that about 100 g of the composite oxide powder of Reference Example 1, which was manufactured as shown above, 50 g of alumina powder, 30 g of ceria powder, and 10 g of an aqueous solution of dinitrodiamine platinum nitrate (4.6% by mass of 8P manufactured by Tanaka Kikinzoku Kogyo KK) were added into ion-exchanged water, the mixture was stirred for 1 hour, and a catalyst powder of Reference Example 1 was obtained.

<Carrying of Catalyst Powder on Base Material>

Next, in the same manner as that of Comparative Example 1, 180 g of the catalyst powder of Reference Example 1 obtained as described above was carried on a straight flow honeycomb base material for evaluation, and thus, a catalyst carrying honeycomb base material of Reference Example 1 was obtained.

A coat amount of the catalyst carrying honeycomb base material of Reference Example 1 was 100 g of the Nd—Pr—Zr composite oxide powder, 50 g of alumina powder, and 30 g of ceria powder. An outline of the catalyst of Reference Example 1 is shown in Table 2.

<<Evaluation 1>>

An exhaust gas from a 2000 cc lean-burn gasoline engine that implements combustion at an air-fuel ratio in the range of 24 to 28 in a steady state was flowed to catalyst carrying honeycomb base materials of Comparative Examples and Reference Example, and the number of exhausted PMs was measured. Results are shown in Table 2. The engine was driven under an EC mode, and the rotation number of the engine was in the range of about 600 rpm (during idle) to about 2500 (during high load). In terms of the number of exhausted PMs in Comparative Example 3 where only a straight flow honeycomb base material for evaluation on which a catalyst is not carried was used, the oxidation removal rate of the PMs was calculated.

<<Evaluation 2>>

An exhaust gas from a 2400 cc supercharged stoichiometric gasoline engine that combusts at a theoretical air-fuel ratio (air-fuel ratio: about 14.5) in a steady state was flowed to catalyst carrying honeycomb base materials of Comparative Examples and Reference Example, and the number of exhausted PMs was measured. Results are shown in Table 3. The engine was driven in an EC mode, and the rotation number of the engine was in the range of about 450 rpm (during idle) to about 2500 (during high load). In terms of the number of exhausted PMs in Comparative Example 3 where only a straight flow honeycomb base material for evaluation on which a catalyst is not carried, was used, the oxidation removal rate of the PMs was calculated.

TABLE 2

| | | Coat amount | Noble metal (Carrying amount) | Number of exhausted PM particles ($\times 10^{13}$) (PM oxidation removal rate) | |
|---|---|---|---|---|---|
| | | | | Lean atmosphere-evaluation 1 | Stoichiometric atmosphere-evaluation 2 |
| Comparative Example 1 | Al—Ce—Zr particles | 150 g | Pt (3 g/base material-L) | 10.2 (70%) | 10.1 (0%) |
| | — | — | | | |
| | Ce particles | 30 g | | | |
| | Sum total | 180 g | | | |
| Comparative Example 2 | Nd—Zr particles | 100 g | Pt (3 g/base material-L) | 6.9 (80%) | — |
| | Al particles | 50 g | | | |
| | Ce particles | 30 g | | | |
| | Sum total | 180 g | | | |
| Comparative Example 3 | — | — | — | 34.3 (0% (Standard)) | 25.3 (0% (standard)) |
| | — | — | | | |
| | Sum total | 0 g | | | |

TABLE 2-continued

| | Coat amount | Noble metal (Carrying amount) | Number of exhausted PM particles ($\times 10^{13}$) (PM oxidation removal rate) | |
|---|---|---|---|---|
| | | | Lean atmosphere-evaluation 1 | Stoichiometric atmosphere-evaluation 2 |
| Reference Example 1 | Nd—Pr—Zr particles | 100 g | Pt (3 g/base material-L) | 2.2 (94%) | 13.0 (14.9%) |
| | Al particles | 50 g | | | |
| | Ce particles | 30 g | | | |
| | Sum total | 180 g | | | |

From results of experiments of Evaluation 1, it is understood that regarding the oxidation removal of the PMs contained in an exhaust gas from the lean-burn engine, the exhaust gas purifying catalyst of Reference Example 1 that includes a composite oxide of neodymium, praseodymium and zirconium is more excellent than the exhaust gas purifying catalyst of Comparative Example 1 that includes a composite oxide of aluminum, cerium and zirconium.

Further, on the contrary, from results of experiments of Evaluation 2, it is understood that regarding the oxidation removal of the PMs contained in an exhaust gas from the stoichiometric engine, the exhaust gas purifying catalyst of Comparative Example 1 is more excellent than the exhaust gas purifying catalyst of Reference Example 1.

Comparative Example 4 and Examples 1 to 13

In the same manner as Reference Example 1 except that compositions were changed as shown in the Table 3 below, catalyst carrying honeycomb base materials of Comparative Example 4 and Examples 1 to 13 were obtained. That is, for example, in Example 1, a catalyst carrying honeycomb base material was obtained with nitrates of praseodymium, neodymium, zirconium, and lanthanum.

<<Evaluation 3>>

While a model gas of a lean atmosphere (oxygen concentration: 6%) that contains hydrocarbons was flowed to the catalyst carrying honeycomb base material, a temperature of the model gas was raised to 550° C. and a purifying concentration of total hydrocarbon (THC) at this temperature was evaluated. Here, a heating rate was 30° C./minute and a spatial velocity was 50,000 $s^{-1}$.

<<Evaluation 4>>

In the same manner as Evaluation 3 except that a model gas of a stoichiometric atmosphere (oxygen concentration: 0.6%) was used, evaluation was conducted.

<<Evaluation 5>>

About 0.5 g of the PM was absorbed in advance by a catalyst carrying honeycomb base material and kept thereon. While a model gas of lean atmosphere (oxygen concentration: 7%) was flowed to the catalyst carrying honeycomb base material that holds the PMs obtained as shown above, a temperature of the model gas was elevated to 560° C., an oxidation removal amount of the PMs until this time was evaluated. The heating rate was 30° C./minute, and the spatial velocity was 50,000 $s^{-1}$.

<<Evaluation 6>>

Except that a model gas of a stoichiometric atmosphere (oxygen concentration: 0.6%) was used, in the same manner as that of Evaluation 5, evaluation was conducted.

Results of Evaluations 3 to 6 are shown in the following Table 3.

From the Table 3 described above, it can be understood that, in the exhaust gas purifying catalysts of the present invention, the characteristics thereof can be adjusted by the use of the fourth metal oxide. Specifically, regarding the oxidation removal of hydrocarbon components, it is understood that when lanthanum oxide, yttrium oxide, strontium oxide, or barium oxide is used as the fourth metal oxide, in particular, when yttrium oxide, strontium oxide, or barium oxide is used, a preferable result can be obtained. Further, regarding the combustion removal of carbon, it is understood that when a combination of lanthanum oxide and yttrium oxide, or a combination of lanthanum oxide and silicon oxide is used as the fourth metal oxide, a preferable result can be obtained. Still further, it is understood that when a combination of zirconia and ceria is used as the third metal oxide, not only hydrocarbon purifying performance in the lean atmosphere, but also the hydrocarbon purifying performance in the stoichiometric atmosphere can be improved.

TABLE 3

| | | Comparative Example 4 | Example 1 | Example 2 | Example 3 | Example 4 | Example 5 | Example 6 | Example 7 | Example 8 | Example 9 | Example 10 | Example 11 | Example 12 | Reference Example 13 |
|---|---|---|---|---|---|---|---|---|---|---|---|---|---|---|---|
| First metal oxide | Pr | — | 20 | 20 | 20 | 20 | 20 | 20 | 20 | — | 20 | 20 | 20 | 20 | 20 |
| | Tb | — | — | — | — | — | — | — | 4 | 20 | — | — | — | — | — |
| Second metal oxide | Nd | — | 36 | 36 | 36 | 36 | 36 | 36 | 36 | 36 | 35 | 36 | 36 | 36 | 36 |
| Third metal oxide | Zr | 70 | 36 | — | 36 | 36 | 36 | 36 | 36 | 36 | 40 | 36 | 36 | 36 | 36 |
| | Zr/Ce | — | — | 36 | — | — | — | — | — | — | — | — | — | — | — |
| | Ce | 30 | — | — | — | — | — | — | — | — | — | — | — | — | — |
| Fourth metal oxide | La | — | 8 | 4 | 4 | — | — | — | 4 | 4 | 5 | 4 | 4 | 4 | 8 |
| | Y | — | — | 4 | — | 8 | 4 | 4 | — | 4 | — | — | 4 | — | — |
| | Ba | — | — | — | — | — | 4 | — | — | — | — | — | — | — | — |
| | Sr | — | — | — | 4 | — | — | 4 | — | — | — | — | — | — | — |
| | Si | — | — | — | — | — | — | — | — | — | — | — | — | 4 | — |
| | Mn | — | — | — | — | — | — | — | — | — | — | 4 | — | — | — |
| Noble metal | | Pt | Pt | Pt | Pt | Pt | Pt | Pt | Pt | Pt | Pt | Pt | Pt | Pt | Pd |
| Purifying concentration of THC (ppm) | Lean evaluation 3 | 545 | 595 | 715 | 700 | 677 | 713 | 695 | 733 | 754 | — | — | — | — | — |
| | Lean evaluation 4 | 599 | — | 998 | — | — | 826 | — | — | 882 | 138 | −140 | 199 | 176 | 178 |
| Combustion amount of C (mg) | Lean evaluation 5 | 139 | 122 | — | — | — | — | — | — | — | 17 | — | 75 | 74 | 73 |
| | Stoichiometric evaluation 6 | 86 | 85 | — | — | — | — | — | — | — | — | — | — | — | — |

What is claimed is:

1. A catalyst composition comprising:
   a first metal oxide selected from the group of praseodymium oxide, terbium oxide, and a combination thereof;
   a second metal oxide that is neodymium oxide;
   a third metal oxide that is a combination of zirconia and ceria; and
   a fourth metal oxide selected from the group consisting of lanthanum oxide, yttrium oxide, barium oxide, calcium oxide, strontium oxide, silicon oxide, and a combination thereof,
   wherein a weight ratio of the sum total of the first and second metal oxides to the third metal oxide is 3:7 to 7:3 when weights of the first and second metal oxides are converted to weights of the corresponding trivalent oxides.

2. The catalyst composition according to claim 1, wherein the fourth metal oxide is a combination of lanthanum oxide and yttrium oxide, or a combination of lanthanum oxide and silicon oxide.

3. The catalyst composition according to claim 1, wherein one or more of the first to fourth metal oxides, alone or in combination, form composite oxides.

4. The catalyst composition according to claim 1, wherein a weight ratio of the first metal oxide to the second metal oxide is 1:9 to 9:1 when the weight ratio is calculated on the basis of the corresponding trivalent oxides.

5. The catalyst composition according to claim 1, wherein a noble metal is further carried on the first metal oxide and the second metal oxide.

6. The catalyst composition according to claim 1, wherein the catalyst composition is an exhaust gas purifying catalyst.

7. The catalyst composition according to claim 1, wherein the catalyst composition is an exhaust gas purifying catalyst for use in a lean-burn engine.

8. A catalyst powder comprising:
   a first metal oxide selected from the group of praseodymium oxide, terbium oxide, and a combination thereof;
   a second metal oxide that is neodymium oxide;
   a third metal oxide that is a combination of zirconia and ceria; and
   a fourth metal oxide selected from the group consisting of lanthanum oxide, yttrium oxide, barium oxide, calcium oxide, strontium oxide, silicon oxide, and a combination thereof,
   wherein a weight ratio of the sum total of the first and second metal oxides to the third metal oxide is 3:7 to 7:3 when weights of the first and second metal oxides are converted to weights of the corresponding trivalent oxides.

9. A catalyst device comprising:
   a base material; and
   the catalyst composition according to claim 1, which is carried on the base material.

10. The catalyst device according to claim 9, wherein the catalyst device further includes a ceria particle carried on the base material.

11. The catalyst device according to claim 9, wherein the base material is a straight flow honeycomb base material.

12. A method for purifying an exhaust gas comprising:
   bringing an exhaust gas from a lean-burn engine into contact with the catalyst composition according to claim 1, or introducing an exhaust gas from a lean-burn engine to the catalyst device according to claim 9.

13. The method for purifying an exhaust gas according to claim 12, wherein the lean-burn engine is a lean-burn gasoline engine or diesel engine.

14. The method for purifying an exhaust gas according to claim 12, wherein the exhaust gas that is brought into contact with the catalyst composition, or the exhaust gas that is made to flow into the catalyst device is further brought into contact with a NOx storage and reduction catalyst.

15. The method for purifying an exhaust gas according to claim 13, wherein an exhaust gas from the lean-burn engine is intermittently rendered into a stoichiometric or fuel-rich atmosphere.

* * * * *